Dec. 6, 1960

R. C. RUMBLE 2,962,895

FLUID METER

Filed Oct. 28, 1957

INVENTOR.
Robert C. Rumble,
BY John J. Schneider
ATTORNEY

United States Patent Office 2,962,895
Patented Dec. 6, 1960

2,962,895

FLUID METER

Robert C. Rumble, Houston, Tex., assignor, by mesne assignments, to Jersey Production Research Company, Tulsa, Okla., a corporation of Delaware Filed Oct. 28, 1957, Ser. No. 692,916

12 Claims. (Cl. 73—155)

This invention relates to a fluid meter for measuring the rate and direction of fluid flow. More particularly, this invention relates to a photoelectric type flowmeter especially adaptable for determining the rate and direction of fluid flow in well bores.

Briefly, the invention comprises first and second magnetically coupled rotatable shafts arranged in a housing, an impeller means connected to said first shaft adapted to rotate in response to fluid flow through said housing, at least one perforated disc connected to said second shaft and photoelectric means arranged adjacent said disc adapted to generate and register electrical signals responsive to the rate and direction of fluid flow through said housing. Magnetic suspension means is provided adapted to exert a lifting force on said first shaft and to filter debris. The invention also includes at least one debris guard means adapted to prevent debris from contacting said magnetic couple. The photoelectric means includes, in one embodiment, a source of light or lamp arranged on one side of a perforated disc and a sun battery arranged on the other side thereof. In another embodiment the photoelectric means includes two spaced-apart discs; a lamp arranged between said discs; a sun battery arranged above one of said discs; and another sun battery arranged below said other disc.

To determine direction of flow the disc or discs are provided with a plurality of spaced-apart openings arranged such that different sequences of electrical signals are generated when the disc or discs rotate in opposite directions. Alternately, the disc or discs may be provided with openings of varying width such that different types of electrical signals are generated when the disc or discs rotate in opposite directions.

Therefore, a primary object of this invention is to provide a device adapted to render improved determination of rate and direction of fluid flow in boreholes.

This and other objects of the invention will be apparent from a description of the drawings wherein.

Figure 1:
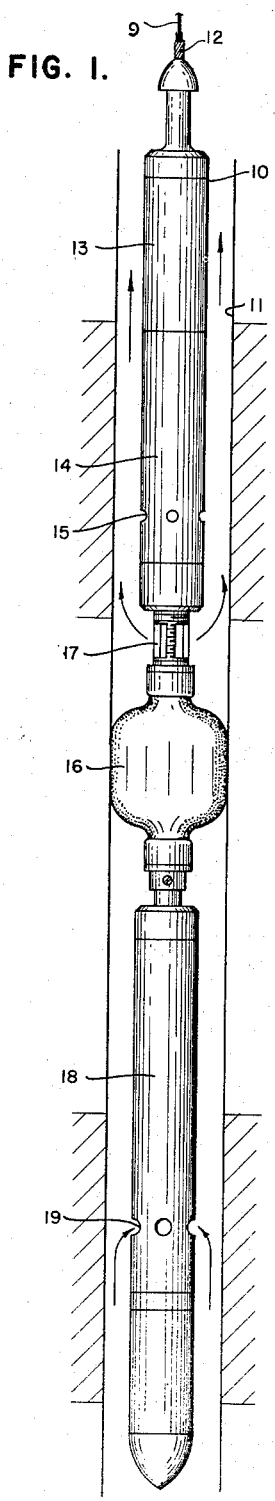
Fig. 1 is an elevational view of the device of the invention arranged in a borehole and connected to a preferred type of packer equipment.

Referring more particularly to the drawings:

In Fig. 1 is shown a fluid meter, generally designated 10, suspended in a borehole 11 by means of a cable 12, which is metallic sheathed and carries a single insulated inner conductor 9. Meter 10 is generally in accordance with apparatus shown and described in U.S. patent application Serial No. 602,047, entitled "Combination Subsurface Packer and Flowmeter," filed August 3, 1956, by Rumble et al., now Patent No. 2,856,006. The apparatus includes a motor section 13, a pump section 14 provided with a pump intake 15, a packer section 16 provided with fluid inlet and outlet ports 17, and a flowmeter section 18 provided with fluid inlet and outlet ports 19.

Figure 2:
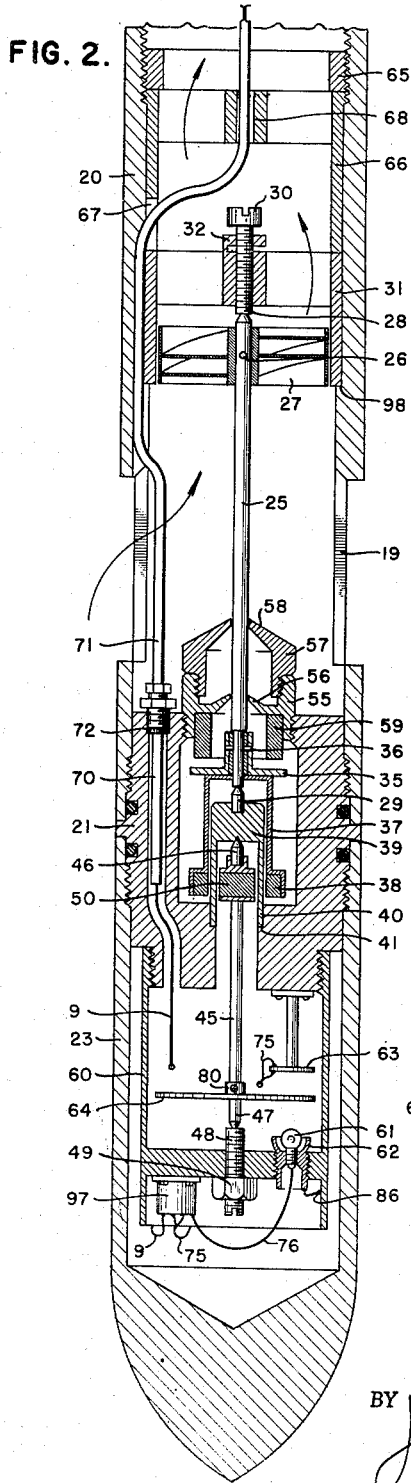
Fig. 2 is a vertical view, partly in section, of the device of the invention.

Flowmeter section 18, shown in detail in Fig. 2, comprises a cylindrical housing 20 screw-threadedly connected to a wall member 21 adjacent its lower end and adapted to be screw-threadedly connected to packer section 16 adjacent its upper end. Housing 20 is formed to provide ports 19, which ports are adapted to permit ingress or egress of fluids therethrough. A nose plug 23 is screw-threadedly connected to wall member 21. Within cylindrical housing 20 is arranged a rotatable shaft 25 to which is secured adjacent the upper end thereof a turbine impeller 27 by means of a pin 26. Shaft 25 is mounted between an upper adjustable pivot bearing 28 and a lower pivot bearing 29. Upper bearing 28 is adjusted by means of a screw 30 supported in a spider 31 which is provided with a locking lip 32 adapted to maintain bearing adjustment.

A magnetic suspension disc and sleeve 35, composed of a non-corrosive, magnetically permeable metal, such as mu metal, is secured to shaft 25 adjacent the lower end thereof by means of pin 36. Also secured to shaft 25 by means of pin 36 is a non-magnetic, stainless steel bell-shaped housing 37 to which is secured a follower drive magnet 38. Magnet 38 is a polarized ring magnet, of material such as, for example, Alnico V, provided with a single pair of poles at opposite extremities of the inside diameter of the ring.

Bearing 29 is supported by a plug member 39 which is provided with a non-magnetic metallic sleeve 40 silver soldered to wall member 21 as at 41. Sleeve 40 is capable of withstanding any well pressures which may be encountered. A lower rotatable shaft 45 is mounted in nose plug 23 between an upper pivot bearing 46 and a lower pivot bearing 47. Upper pivot bearing 46 is mounted in sleeved plug member 39 and pivot bearing 47 is arranged and supported on threaded member 48. Threaded member 48 is provided with a nut 49 for locking threaded member 48 and bearing 47 in a selected position. Shaft 45 contains a transverse bar magnet 50 which is positioned adjacent ring magnet 38 and which readily aligns itself with the poles of ring magnet 38. A debris guard 55, provided with a lip portion 56 which surrounds and extends to adjacent shaft 25, is secured to wall member 21. An additional debris guard 57, provided with a lip portion 58 which also surrounds and extends to adjacent shaft 25, is secured to guard 55. A magnetic suspension ring magnet 59 is secured to the lower debris guard 55.

Magnetic suspension ring magnet 59 which is magnetized in a longitudinal direction exerts a lift on disc and sleeve 35 attached to shaft 25. Also, the magnetic field between magnet 59 and disc and sleeve 35 functions as a potent magnetic debris filter to prevent any minute magnetic debris that may arrive near this location from reaching the magnetic coupling assembly.

Figure 4:
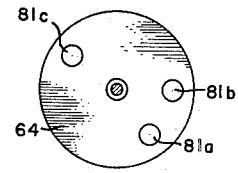
Fig. 4 is a plan view of one embodiment of an element of the photoelectric means.

A wall member 60 is screw-threadedly connected to the lower end of wall member 21. Wall member 60 supports screw 48 and also supports a source of light or lamp 61 arranged in a reflector 62. Wall member 21 supports a self-generating photocell or sun battery 63, which is arranged in vertical and horizontal alignment with lamp 61. A thin, light-weight, low-inertia, opaque, disc 64 is attached to shaft 45 by means of pin 80. Disc 64 is formed to provide irregularly arranged, circumferentially spaced, identically configured openings 81a, 81b, and 81c, as seen in Figs. 3 and 4.

A threaded ring 65 is screw-threadedly connected to cylindrical housing 20. A conductor spider 66 is arranged below threaded ring 65 and is formed to provide a slot 67 and a slotted fitting having a central opening 68 therein. Slotted ring 66 is supported on spider 31, which, in turn, is supported on a shoulder 98 formed on the interior surface of housing 20.

Wall member 21 is formed to provide an opening 70 therethrough. A tubing 71 extends partially through opening 70 and through slot 67, and opening 68, as shown. A fluid-tight connection is made between tubing 71 and wall member 21 at the upper end of opening 70 by means of an O-ring seal 72. Tubing 71 contains conductor 9 for transmitting electrical energy for lighting lamp 61 and for transmitting electrical pulses generated by sun battery 63. Conductor 9 connects to a box 97 which houses a transformer 87 and a condenser 88. Box 97 is connected to sun battery 63 by leads 75 and to lamp 61 by lead 76. Lamp 61 is grounded as at 86.

Figure 3:
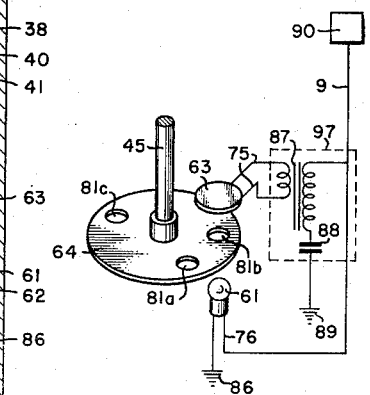
Fig. 3 is an isometric view of one embodiment of the photoelectric elements and including the electric circuit therefor.

In Fig. 3 is shown disc 64 provided with the three irregularly spaced openings 81a, 81b, and 81c. Sun battery 63 and lamp 61 are positioned on opposite sides of disc 64 and are vertically aligned with the radial positions of openings 81a, 81b, and 81c. Lead 76 connects to conductor 9. Leads 75 connect to transformer 87, the secondary of which has one lead connected to condenser 88 which is grounded as at 89 and the other lead of which is connected to conductor 9 which, in turn, connects to pulse rate indicator equipment such as an oscilloscope, or aural monitor, or other type recorder designated 90 arranged on the surface of the earth.

Figure 4A:
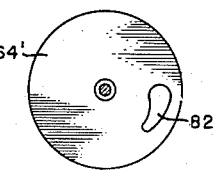
Fig. 4A is a plan view of another embodiment of an element of the photoelectric means.

Figs. 4 and 4A illustrate two types of discs which may be utilized. In the Fig. 4 embodiment three openings 81a, 81b, and 81c are irregularly spaced, circumferentially about the center of disc 64. The openings are identically configured and spaced the same radial distance from the center. At least three openings are necessary in this arrangement in order to obtain different signal sequences upon reversal of direction of rotation of the disc. In the Fig. 4A embodiment a single opening 82 is formed in a disc 64'. Opening 82 is irregularly shaped and in this instance narrows in width in a clockwise circumferential direction. More than one opening may be utilized; however, the essential feature is the configuration of the opening which is such that the amount of light transmitted through the opening varies as disc 64' rotates. Other configurations such as wedge shaped openings are within the compass of the invention.

Figure 5:
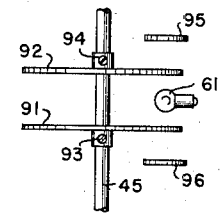
Fig. 5 is a vertical view of another type photoelectric means according to the invention.

In Fig. 5 a modified form of photoelectric elements is shown. In this embodiment two spaced-apart perforated discs 91 and 92 are attached to shaft 45 by means of pins 93 and 94, respectively. Lamp 61 is arranged between discs 91 and 92; a sun battery 95 is arranged above disc 92 and a sun battery 96 is arranged below disc 91. Discs 91 and 92 are identical, whether the embodiment of Fig. 4 or that of Fig. 4A is employed as the disc elements. In this modification more of the light emitted by the bulb will be utilized, which will render a stronger electrical signal. The electrical connections will be the same as those shown in Fig. 3, except that batteries 95 and 96 will be connected either in series or in parallel to fit the circuit conditions.

Operation of the pump for inflating and deflating the packer is fully described in the Rumble et al. patent application, noted supra. Also described in this patent application is an electrical circuit arrangement whereby the pump and packer and the flowmeter are sequentially operated. That is, the flowmeter is disconnected from the circuit when the pump is inflating or deflating the packer and the pump motor is disconnected from the circuit when the flowmeter is registering electrical signals.

When it is desired to determine rate and direction of fluid flow in a borehole, the meter with the packer in deflated condition is lowered in the borehole by means of cable 12 to a desired depth. Motor section 13 then is energized to operate pump section 14 to inflate the packer. When the packer has been inflated an amount sufficient to seal off the borehole, fluid passes through the meter. Upward flow is illustrated in Figs. 1 and 2; however, the flow direction may be downwardly. Thus, as shown, fluid enters flowmeter 18 through ports 19 and exits the instrument through ports 17. At this time the pump motor is disconnected from the circuit and the flowmeter connected thereto in order to measure the rate and direction of fluid flow in the borehole.

The fluid flowing through housing 20 impinges upon turbine impeller 27 which causes the turbine impeller to rotate in one direction. Rotation of the impeller rotates shaft 25, which rotates disc and sleeve 35 connected thereto and also rotates the bell-shaft housing 37 on which is located ring magnet 38. Rotation of ring magnet 38 rotates shaft 45 magnetically coupled to shaft 25 by means of magnet 50. Rotation of shaft 45 rotates disc 64. As disc 64 rotates electrical signals across leads 75 of sun battery 63 are created as the light from lamp 61 is interrupted by the irregular spacings between openings 81a, 81b, and 81c in disc 64. The electrical signals are transmitted via cable 12 to the monitor and indicator equipment 90 on the earth's surface in the manner as described in the Rumble et al. patent application, noted supra. The average frequency of the pulses transmitted is a measure of flow rate and the unique sequence of pulses indicates direction of flow.

If the disc of Fig. 4A is employed wherein the irregularly shaped opening 82 is formed in the disc, the pulse frequency still indicates rate; however, instead of unique sequences of pulses indicating direction of flow, pulse shapes provide an indication of direction of flow.

Having fully described the nature, objects and elements of the invention, I claim:

1. A flowmeter for use in determining rate and direction of fluid flow in a well bore comprising a housing; means separating said housing into an upper chamber open to fluid flow and a closed lower chamber; an upper rotatable shaft provided with fluid flow responsive means arranged in said upper chamber; a ring magnet connected to said upper shaft and rotatable therewith; a magnetically permeable metallic disc connected to said upper shaft and positioned above said ring magnet; a stationary magnet mounted on said housing above said disc adapted to exert a lift on said disc and the upper shaft connected thereto, said stationary magnet and said disc also functioning to collect magnetic debris; debris guard means extending to adjacent said upper shaft mounted on said housing and positioned above said stationary magnet adapted to prevent debris from falling therebelow; a lower rotatable shaft arranged in said lower chamber; a bar magnet mounted on said lower shaft and rotatable therewith, said bar magnet being positioned adjacent said rotatable ring magnet to form therewith a magnetic couple whereby rotation of said fluid flow responsive means rotates said upper shaft and said ring magnet which, in turn, rotates said bar magnet and said lower shaft; an opaque disc mounted on said lower shaft and rotatable therewith; a battery arranged on one side of said disc adapted to generate electrical pulses in response to light impinging thereon, a light source arranged on the other side of said disc; said disc being provided with at least one perforation to allow light from said light source to impinge on said battery through said perforation and an electrical circuit including means for registering said electrical pulses generated in response to rotation of said disc, the frequency of said electrical pulses indicating rate of fluid flow and the pulse pattern of said electrical pulses indicating the direction of fluid flow through said upper chamber.

2. Apparatus as recited in claim 1 including said perforated disc being provided with at least three irregularly spaced, identically shaped openings.

3. Apparatus as recited in claim 1 including said perforated disc being provided with at least one opening varying in width in a circumferential direction.

4. Apparatus as recited in claim 1 including an additional perforated disc and an additional battery adapted to generate electrical pulses in response to light impinging thereon, said light source being arranged between said perforated discs and said batteries being positioned on the opposite sides of said perforated discs.

5. Apparatus as recited in claim 4 including each of the perforated discs being provided with at least three irregularly spaced, identically shaped openings, the openings in one disc being aligned with the openings in the other disc.

6. Apparatus as recited in claim 4 including each of the perforated discs being provided with at least one opening varying in width in a circumferential direction, the opening in one disc being aligned with the opening in the other disc.

7. A flowmeter for use in determining rate and direction of fluid flow in a well bore comprising a housing; means separating said housing into an upper chamber open to fluid flow and a closed lower chamber; an upper rotatable shaft provided with fluid flow responsive means arranged in said upper chamber, a first magnet connected to said upper shaft and rotatable therewith; a disc member connected to said upper shaft and positioned above said first magnet; a second magnet mounted on said housing above said disc member adapted to exert a lift on said disc and connected upper shaft, said second magnet and said disc member also functioning to collect magnetic debris; debris guard means extending to adjacent said upper shaft mounted on said housing and positioned above said second magnet adapted to prevent debris from falling therebelow; a lower rotatable shaft arranged in said lower chamber, a third magnet mounted on said lower shaft and rotatable therewith; said third magnet being positioned adjacent said first magnet and forming therewith a magnetic couple whereby rotation of said fluid flow responsive means rotates said upper shaft and said first magnet which, in turn, rotates said third magnet and said lower shaft; an opaque perforated member mounted on said lower shaft and rotatable therewith; light responsive means adapted to generate electrical pulses in response to impinging light rays arranged on one side of said opaque member, a light source arranged on the other side of said opaque member; said opaque member being provided with at least one perforation, an electrical circuit including means for registering said electrical pulses generated in response to rotation of said perforated member, the frequency of said electrical pulses indicating rate of fluid flow and the pulse pattern of said electrical pulses indicating direction of fluid flow through said upper chamber.

8. Apparatus as recited in claim 7 including said perforated member being provided with at least three irregularly spaced, identically shaped openings.

9. Apparatus as recited in claim 7 including said perforated member being provided with at least one opening varying in width in a circumferential direction.

10. Apparatus as recited in claim 7 including an additional perforated member and an additional light responsive means, said light source being positioned between said perforated members and each of said light responsive means being positioned adjacent one of said perforated members.

11. Apparatus as recited in claim 10 including each of said perforated members being provided with at least three irregularly spaced, identically shaped openings, the openings in one perforated member being aligned with the openings in the other perforated member.

12. Apparatus as recited in claim 10 including each of said perforated members being provided with at least one opening varying in width in a circumferential direction, the opening in one perforated member being aligned with the opening in the other perforated member.

References Cited in the file of this patent

UNITED STATES PATENTS

| | | |
|---|---|---|
| 1,957,681 | Thompson | May 8, 1934 |
| 2,204,463 | Allen | June 11, 1940 |
| 2,346,864 | Packard | Apr. 18, 1944 |
| 2,449,973 | Bergman | Sept. 28, 1948 |
| 2,487,783 | Bergman | Nov. 15, 1949 |
| 2,593,285 | Fay et al. | Apr. 15, 1952 |
| 2,671,174 | Burgholz | Mar. 2, 1954 |